UNITED STATES PATENT OFFICE.

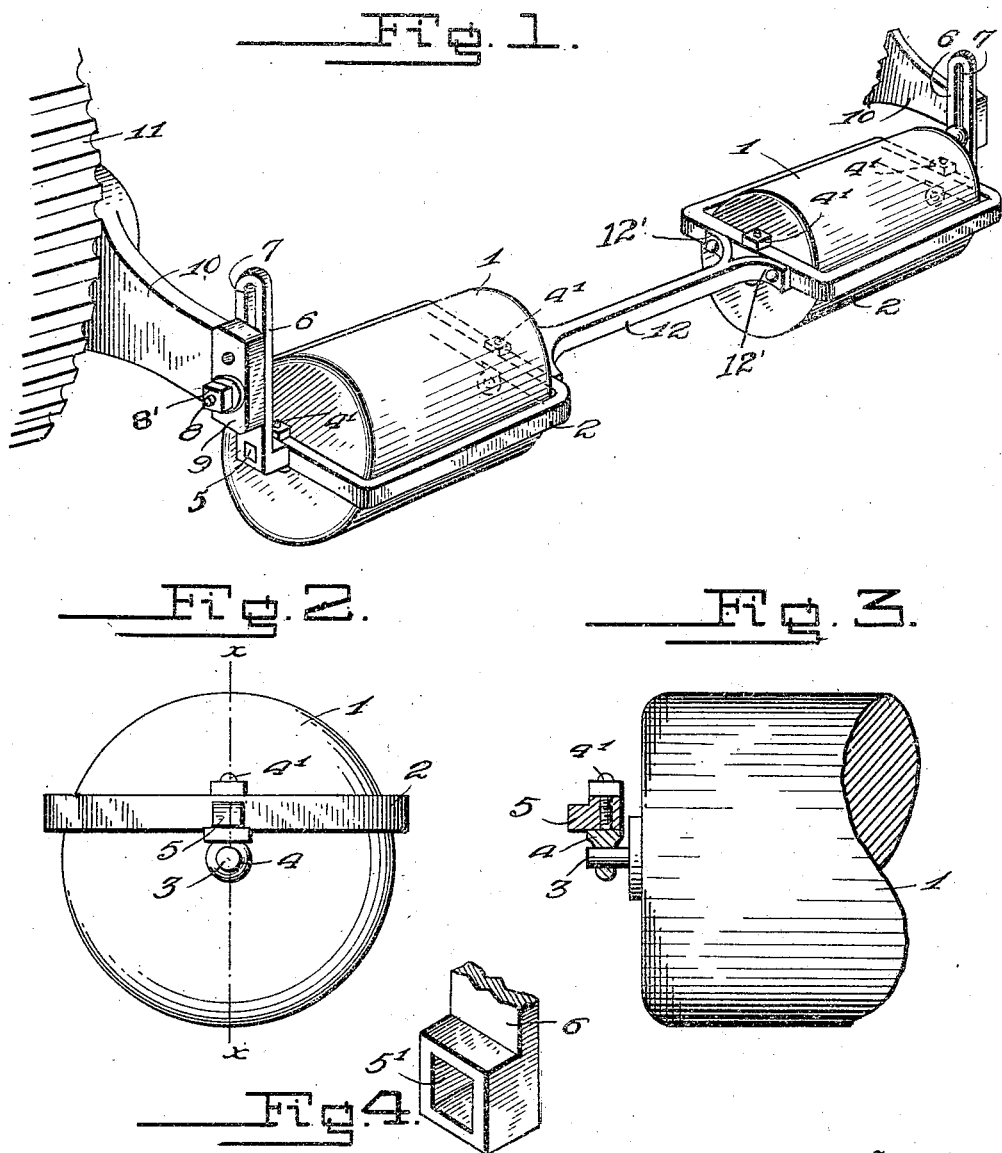

FRANK J. GUY, OF ARCANUM, OHIO.

LAWN-MOWER ROLLER.

992,499. Specification of Letters Patent. Patented May 16, 1911.

Application filed October 8, 1910. Serial No. 586,046.

*To all whom it may concern:*

Be it known that I, FRANK J. GUY, a citizen of the United States, residing at Arcanum, in the county of Darke and State of Ohio, have invented certain new and useful Improvements in Lawn-Mower Rollers, of which the following is a specification, reference being had therein to the accompanying drawing.

This invention relates to lawn mowers and has special reference to the roller mechanism located behind the cutters.

This invention has for its object to provide an improvement in the roller mechanism of lawn mowers. By employing two rollers the lawn mower will not bounce or jerk in running over uneven ground, and will make a light and serviceable attachment.

Referring to the accompanying drawings:—Figure 1 is a view in perspective of a roller attachment for lawn mowers constructed in accordance with this invention. Fig. 2 is a view of one of the rollers and its supporting frame. Fig. 3 is an enlarged detail view of a portion of one of the rollers, with one of its supports in vertical section on the line X—X of Fig. 2. Fig. 4 is an enlarged detail view of a portion of a bracket arm on which the roller frame is mounted.

In carrying out the invention, in lieu of the ordinary roller used for lawn mowers, two rollers 1 are provided each of which is mounted in a rectangular frame 2. The rollers 1 are provided at each end with a pintle 3, which pintle engages an eye formed in the head 4 of a bolt 4 which bolt passes through the frame 2 and is held in place by means of a nut 4' threaded upon the upper end thereof.

Each of the frames 2 is provided upon its outer end with an integral laterally extending lug 5 at one end thereof which is squared in cross section and is seated in a square aperture 5' which aperture extends through the arm 6 from side to side. The aperture 5' is formed in the lower end of the arm 6 as clearly shown in Fig. 1 of the drawing. The arm 6 is also provided with a vertical slot 7 through which extends a bolt 8 which also extends through a block 9 formed upon the outer end of the arm 10 projecting from the frame of the lawn mower adjacent to the driving roller 11. The arm 6 may be raised and lowered from the arm 10 by means of the bolt 8 which is secured in adjusted position in the slotted arm 6 by means of the nut 8', thereby adapting the adjacent roller 1 to be raised and lowered. The adjacent ends of the frame 2 are connected together by means of a metallic rod 12 which rod is provided at each end with oppositely flared feet 12', which feet act as a brace for holding the rectangular frames in their correct position and preventing any relative movement. By means of the adjustable connection of the outer ends of the rollers 1, the cutters of the lawn mower which are located in the front of said rollers and mounted on the frame connected with the arm 10 may be raised and lowered and adjusted in position above the ground. It will also be obvious that through the medium of this adjustable connection the rollers may also be readily detached from the machine when necessary.

Having described the invention, I claim:—

1. An attachment for lawn mowers consisting of a pair of frames, spaced apart from each other longitudinally, a roller in each of said frames, a bar connecting said frames at their adjacent ends, and means adjustably connecting said frames with the frame of a lawn mower.

2. An attachment for lawn mowers consisting of a pair of rectangular frames, spaced apart from each other, a roller in each of said frames, a longitudinal bar connecting the adjacent ends of said frames, a vertical arm on the outer end of each of said frames, and means for adjustably connecting said arm to the frame of a lawn mower.

3. A lawn mower consisting of a pair of rectangular frames spaced apart from each other, a roller in each of said frames, a longitudinal bar connecting the adjacent ends of said frames, a vertical slotted arm on the outer end of each of said frames, and an arm on the lawn mower frame adjustably connected with said slotted arm.

4. An attachment for lawn mowers consisting of a pair of rectangular frames spaced apart from each other at their adjacent ends, a roller in each of said frames, a bar connecting the adjacent ends of said frames, each of said frames having a lug on its outer end, a vertical slotted arm having a socket at its lower end engaging said lug on the rectangular frame, and an arm of the frame of the lawn mower adjustably connected to each of said slotted arms.

5. A device of the character described comprising a pair of rectangular frames, a roller in each of said frames, connecting arm provided with oppositely extending feet, bolts passing through said oppositely extending feet and through said rectangular frames for securing said frames to said connecting rod, and means for connecting said frame to the main portion of a mower.

In testimony whereof I hereunto affix my signature in presence of two witnesses.

FRANK J. GUY.

Witnesses:
  J. F. HECK,
  MATTIE J. IVESTER.